US011932009B2

(12) United States Patent
Matsumoto et al.

(10) Patent No.: US 11,932,009 B2
(45) Date of Patent: Mar. 19, 2024

(54) PRINTING APPARATUS

(71) Applicant: SEIKO EPSON CORPORATION, Tokyo (JP)

(72) Inventors: Yusuke Matsumoto, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/656,050

(22) Filed: Mar. 23, 2022

(65) Prior Publication Data

US 2022/0305821 A1 Sep. 29, 2022

(30) Foreign Application Priority Data

Mar. 25, 2021 (JP) ................................ 2021-051764

(51) Int. Cl.
  *B41J 11/42* (2006.01)
  *B41J 13/08* (2006.01)
(52) U.S. Cl.
  CPC ............... *B41J 11/42* (2013.01); *B41J 13/08* (2013.01)
(58) Field of Classification Search
  CPC ......... B41J 11/007; B41J 13/08; B41J 15/048
  See application file for complete search history.

(56) References Cited

U.S. PATENT DOCUMENTS

| 2003/0063174 A1* | 4/2003 | Kanome ................ B65H 5/004 347/104 |
| 2009/0233015 A1 | 9/2009 | Fujimoto et al. |
| 2009/0262173 A1* | 10/2009 | Hagiwara ................ B41J 13/08 347/104 |
| 2010/0194795 A1* | 8/2010 | Tsuchiya ................ B41J 11/007 347/1 |

FOREIGN PATENT DOCUMENTS

| JP | 2007-210725 A | 8/2007 |
| WO | 2008/013294 A1 | 1/2008 |

* cited by examiner

*Primary Examiner* — Julian D Huffman
(74) *Attorney, Agent, or Firm* — Global IP Counselors, LLP

(57) ABSTRACT

A printing apparatus includes a printing section that performs printing on a medium containing calcium carbonate, a transport section that rotationally drives a transport belt that forms at least a portion of a transport path in which the medium is transported, a voltage supply section that supplies a charging voltage to a charging roller for charging the transport belt, a detection section that detects whether or not charging abnormality has occurred in the transport belt, a determination section that determines whether a cause of the charging abnormality is abnormality of the voltage supply section or abnormality of the transport belt, and a machine learning section that performs machine learning of a determination condition in the determination section, based on a learning model in which a rotation amount of the transport belt and a detection result of the detection section are associated with each other.

10 Claims, 7 Drawing Sheets

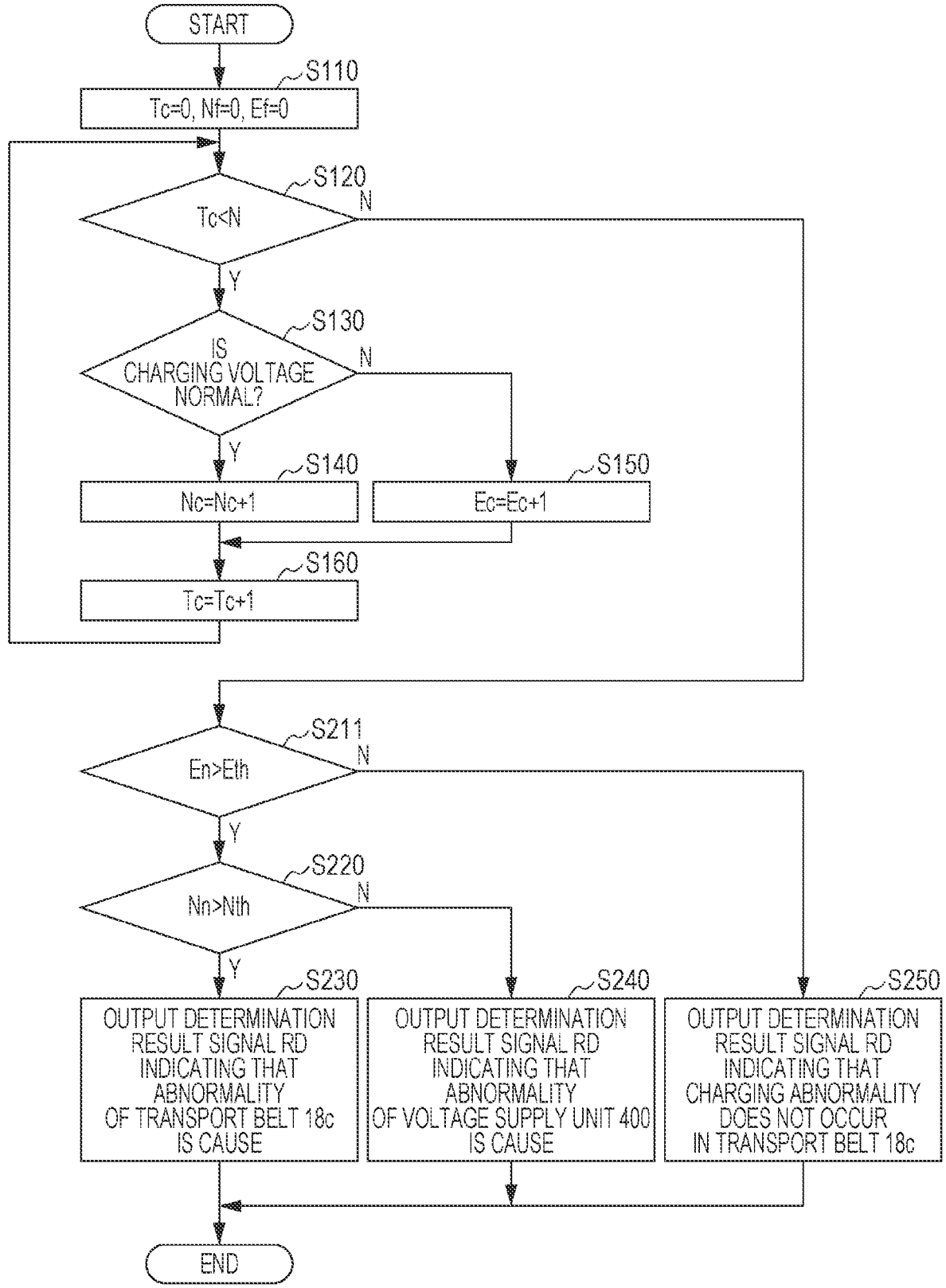

FIG. 12

| NAME OF MATERIAL | FIRST CONDITION | | | | SECOND CONDITION | THIRD CONDITION |
|---|---|---|---|---|---|---|
| | CHEMICAL RESISTANCE | | | | HEAT RESISTANCE | COMPRESSIVE STRENGTH |
| | ORGANIC SOLVENT | SALTS | ALKALIS | ACIDS | | |
| POLYVINYL CHLORIDE | FAIR | GOOD | GOOD | GOOD | - | - |
| POLYVINYLIDENE CHLORIDE | FAIR | GOOD | GOOD | GOOD | - | - |
| POLYETHYLENE | GOOD | GOOD | GOOD | GOOD | GOOD | FAIR |
| POLYPROPYLENE | GOOD | GOOD | GOOD | GOOD | GOOD | FAIR |
| POLYSTYRENE | POOR | GOOD | GOOD | GOOD | - | - |
| ABS RESIN | FAIR | GOOD | GOOD | GOOD | - | - |
| METHACRYLIC RESIN | POOR | GOOD | FAIR | GOOD | - | - |
| NYLON66 | GOOD | GOOD | GOOD | POOR | - | - |
| POLYACETAL | GOOD | GOOD | POOR | POOR | - | - |
| POLYCARBONATE | POOR | GOOD | POOR | GOOD | - | - |
| POLYVINYLIDENE FLUORIDE | GOOD | GOOD | GOOD | GOOD | GOOD | POOR |
| FLUORINE RESIN (TEFLON) | GOOD | GOOD | GOOD | GOOD | GOOD | POOR |
| PHENOL RESIN | GOOD | GOOD | POOR | GOOD | - | - |
| UREA RESIN | GOOD | GOOD | GOOD | GOOD | FAIR | - |
| MELAMINE RESIN | GOOD | GOOD | GOOD | GOOD | GOOD | GOOD |
| UNSATURATED POLYESTER | FAIR | GOOD | FAIR | GOOD | - | - |
| EPOXY RESIN | FAIR | GOOD | GOOD | GOOD | - | - |
| SILICON RESIN | POOR | FAIR | FAIR | POOR | - | - |
| POLYURETHANE RESIN | GOOD | GOOD | FAIR | FAIR | - | - |

PRINTING APPARATUS

The present application is based on, and claims priority from JP Application Serial Number 2021-051764, filed Mar. 25, 2021, the disclosure of which is hereby incorporated by reference herein in its entirety.

BACKGROUND

1. Technical Field

The present disclosure relates to a printing apparatus.

2. Related Art

In recent years, the innovation of the printing technology has been tremendous, and printing has been performed on a wide variety of media. For example, International Publication No. WO 2008/013294 discloses a printing medium having a stucco printing layer as a medium on which printing is performed.

In a printing apparatus, a desired image is formed on a medium in a manner that the medium is transported to a desired transport position by a transport belt and a printing process is executed on the medium by a printing section of an ink jet type, an electrophotographic type, or the like. For example, JP-A-2007-210725 discloses a technique in which a transport belt using polyethylene terephthalate is charged to attract a medium, the transport belt is driven to transport the medium to a desired transport position, and a printing process is performed on the transported medium.

However, when the printing process is performed on a medium containing calcium carbonate such as stucco as disclosed in International Publication No. WO 2008/013294 for a long period, calcium carbonate contained in the medium is accumulated inside the printing apparatus. At the same time, the accumulated calcium carbonate reacts with the moisture contained in the air or the like to be coagulated. Since such coagulated calcium carbonate is harder than the polyethylene terephthalate forming the transport belt disclosed in JP-A-2007-210725, there is a concern that the transport belt is damaged.

In particular, in the printing apparatus as disclosed in JP-A-2007-210725, a high voltage circuit supplies a high voltage to the transport belt to charge the transport belt, thereby attracting the medium to the transport belt and realizing stable medium transport. Therefore, when the transport belt is damaged by the coagulated calcium carbonate, the charging voltage charged on the transport belt may have abnormality, and thus the printing process may be stopped.

That is, when the printing process is performed on a medium containing calcium carbonate as disclosed in International Publication No. WO 2008/013294, by using the printing apparatus as disclosed in JP-A-2007-210725, there is a concern that the operational stability of the printing apparatus is decreased.

SUMMARY

According to an aspect of the present disclosure, a printing apparatus includes a printing section that performs printing on a medium containing calcium carbonate, a transport section that rotationally drives a transport belt that forms at least a portion of a transport path on which the medium is transported, a voltage supply section that supplies a charging voltage to a charging roller for charging the transport belt, a detection section that detects whether or not charging abnormality has occurred in the transport belt, a determination section that determines whether a cause of the charging abnormality is abnormality of the voltage supply section or abnormality of the transport belt, and a machine learning section that performs machine learning of a determination condition in the determination section based on a learning model in which the rotation amount of the transport belt and a detection result of the detection section are associated with each other.

BRIEF DESCRIPTION OF THE DRAWINGS

FIG. 11 is a flowchart illustrating an example of an operation of a determination unit.

FIG. 12 is a diagram illustrating an example of a coating agent that may be used for the transport belt.

DESCRIPTION OF EXEMPLARY EMBODIMENTS

Hereinafter, preferred embodiments of the present disclosure will be described with reference to the drawings. The drawings used are for convenience of description. Embodiments described below do not unreasonably limit the content of the present disclosure described in the claims. Not all of the configurations described below are essential constituent requirements of the present disclosure.

Here, in the following description, as an example of a printing apparatus according to the present disclosure, an ink jet printer that performs printing of an image by discharging an ink to a medium will be described as an example. However, the printing apparatus is not limited to the ink jet printer, and may be, for example, a dot impact printer, a thermal transfer printer, or a laser printer, or may be a copying machine such as a copier. Further, the printing apparatus may be a so-called multifunctional device in which a scanner, a FAX, and the like are integrated, in addition to the ink jet printer, the dot impact printer, the thermal transfer printer, the laser printer, and the like.

1. Structure of Printing Apparatus

Figure 1:
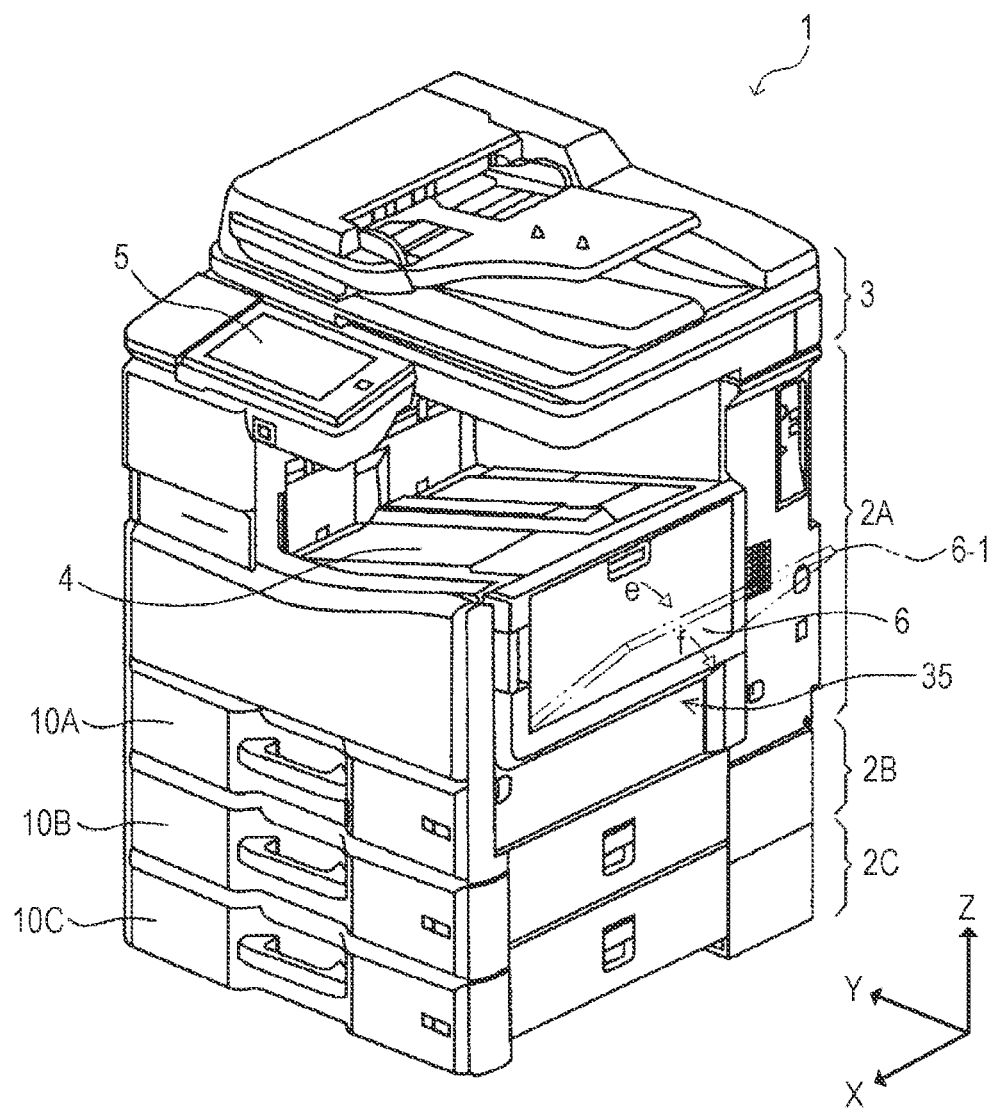
FIG. 1 is a diagram illustrating an external structure of a printing apparatus.

First, an example of the structure of a printing apparatus in the present embodiment will be described. FIG. 1 is a diagram illustrating an external structure of a printing apparatus 1. In the present embodiment, the printing apparatus 1 is a printing apparatus capable of performing printing on a medium containing calcium carbonate, specifically, stucco paper coated with stucco. For example, the printing apparatus 1 is, for example, a so-called ink jet printer that performs printing by discharging or applying an ink being a water-soluble printing material to a medium.

Here, in the following description, a direction corresponding to a depth direction of the printing apparatus 1 may be referred to as an X direction, a direction corresponding to a width direction of the printing apparatus 1 may be referred to as a Y direction, and a direction corresponding to a direction which is a height direction of the printing apparatus 1 and is along the gravity direction may be referred to as a Z direction. Further, in the following description, a direction in which a medium is transported may be referred to as a "downstream", and the opposite side thereof may be referred to as an "upstream". In the following description, description will be made on the assumption that the X direction, the Y direction, and the Z direction are orthogonal to each other, but the present disclosure is limited to a case where the components in the printing apparatus 1 are disposed to be orthogonal to each other.

As illustrated in FIG. 1, the printing apparatus 1 includes an apparatus body 2A that performs printing on a medium, a scanner unit 3 located on an upper side of the apparatus body 2A, and expansion units 2B and 2C located on a lower side of the apparatus body 2A. The apparatus body 2A includes a medium cassette 10A, a discharge tray 4, an operation panel 5, and a feeding unit 35.

Operation information for a user to perform various operations of the printing apparatus 1 is input to the operation panel 5. As such an operation panel 5, for example, a so-called touch panel in which an operation unit to which operation information is input by a user and a display unit that reports information to the user are integrally stacked can be used. That is, the operation panel 5 functions as an operation section that receives an operation of the printing apparatus 1 by the user and a report section that reports the status of the printing apparatus 1 to the user. The operation panel 5 of the printing apparatus 1 may have a configuration in which a pressing switch pressed by the user and a display panel for reporting information to the user are individually provided.

The discharge tray 4 is a discharge port from which the medium after a printing process is performed in the printing apparatus 1 is discharged. The discharge tray 4 in the printing apparatus 1 in the present embodiment corresponds to a face-down discharge tray that discharges the medium in a state where a print surface on which the printing process has been performed recently is directed downward.

The medium cassette 10A accommodates a medium on which the printing process is to be performed in the printing apparatus 1. The printing apparatus 1 sequentially delivers a medium accommodated in the medium cassette 10A from the medium cassette 10A, performs the printing process on the delivered medium, and then discharges the medium from the discharge tray 4.

The feeding unit 35 is located on the side surface of the printing apparatus 1. The feeding unit 35 includes an opening/closing cover 6 capable of opening/closing the apparatus body 2A by rotating around a swing shaft 6a described later. That is, the opening/closing cover 6 is configured to be capable of swinging around the swing shaft 6a, and opens/closes in directions indicated by the arrows e and f illustrated in FIG. 1. In the printing apparatus 1 in the present embodiment, it is possible to perform the printing process on a medium supplied from the feeding unit 35, and the medium on which the printing process is performed is discharged from the discharge tray 4. That is, the feeding unit 35 corresponds to a so-called manual feeding tray used when the user manually feeds a medium. Here, the virtual line and the reference sign 6-1 illustrated in FIG. 1 indicate a state in which the opening/closing cover 6 is being opened/closed.

The expansion unit 2B includes a medium cassette 10B, and the expansion unit 2C includes a medium cassette 10C. The expansion units 2B and 2C are optional units for increasing the number of media accommodated in the printing apparatus 1, and can be freely attached to and detached from the apparatus body 2A.

In the printing apparatus 1 configured as described above, a medium supplied from the medium cassette 10A, 10B, or 10C or the feeding unit 35 is transported in a direction along with a left-right direction of the printing apparatus 1 and the printing process is performed on the transported medium, based on operation information input through the operation panel 5. The medium on which the printing process is performed is discharged from the discharge tray 4. The printing apparatus 1 may perform the printing process based on image information supplied from an external terminal such as a personal computer provided outside the printing apparatus 1 in addition to the operation information input through the operation panel 5.

Figure 2:
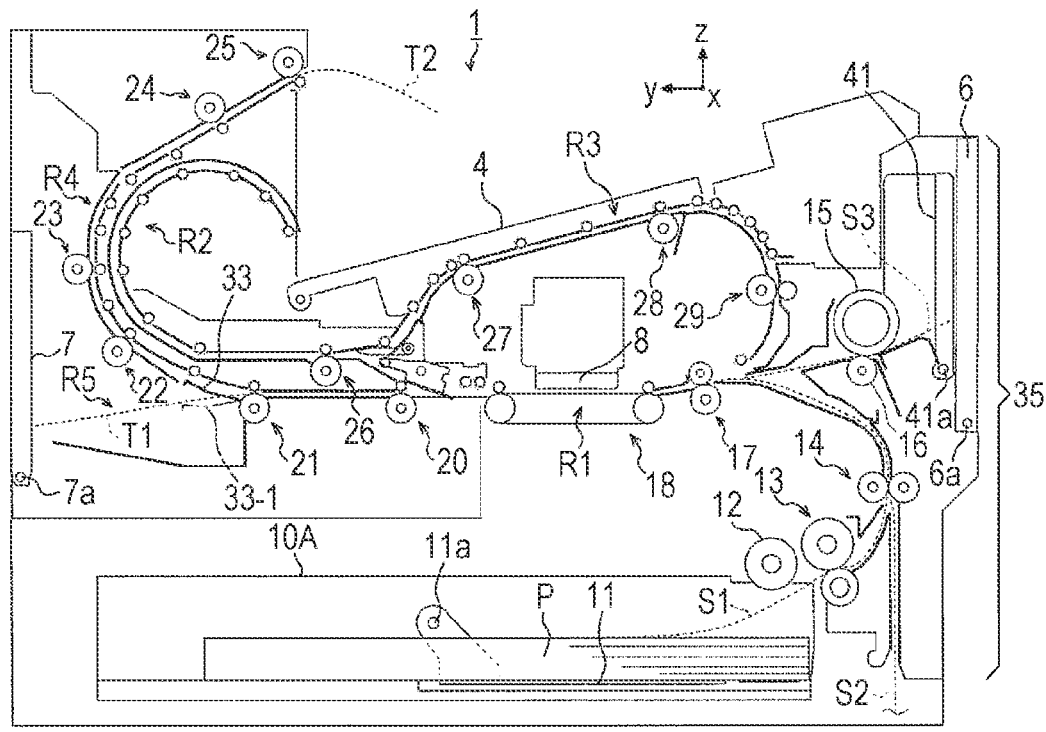
FIG. 2 is a diagram illustrating an internal structure of the printing apparatus.

Next, an example of a transport path in which a medium is transported inside the printing apparatus 1 will be described. FIG. 2 is a diagram illustrating an internal structure of the printing apparatus 1. Here, FIG. 2 illustrates three medium feeding trajectories and two medium discharge trajectories. The three medium feeding trajectories are a feeding trajectory S1 when a medium is fed from the medium cassette 10A, and a feeding trajectory S2 when the medium is fed from the medium cassette 10B or 10C, which are not illustrated in FIG. 2, and a feeding trajectory S3 when the medium is fed from the feeding unit 35. The two medium discharge trajectories are a discharge trajectory T1 when a medium is discharged in a state where a print surface on which the printing process has been performed recently is directed upward, and a discharge trajectory T2 when the medium is discharged in a state where the print surface on which the printing process has been performed recently is directed downward. In the following description, discharging the medium in a state where the print surface on which the printing process has been performed recently is directed upward may be referred to as face-up discharge, and discharging the medium in a state where the print surface on which the printing process has been performed recently is directed downward may be referred to as face-down discharge.

FIG. 2 illustrates five medium transport paths being a recording transport path R1, a switchback transport path R2, a reverse transport path R3, a face-down transport path R4, and a face-up transport path R5, as the medium transport paths in which the medium is transported.

As illustrated in FIG. 2, a flap 33 is provided on the medium transport path in which the medium is transported. The flap 33 is driven by a drive source (not illustrated). Thus, it is possible to switch the transport path in which the medium is to be transported, between the face-down transport path R4 and the face-up transport path R5. Specifically, the flap 33 is switched between a state indicated by the solid line and a state indicated by the virtual line and the reference sign 33-1 in FIG. 2. When the flap 33 is in the state indicated by the solid line, a medium is guided to the face-down transport path R4 and discharged to the discharge tray 4 along the discharge trajectory T2. On the other hand, when the flap 33 is in the state indicated by the virtual line and the reference sign 33-1 in FIG. 2, the medium is guided to the face-up transport path R5 and discharged to the discharge tray 7 along the discharge trajectory T1.

Here, the discharge tray 7 from which the medium transported along the discharge trajectory T1 is discharged may have a stored state as illustrated in FIG. 2 and an open state (not illustrated) by being rotated about a rotation shaft 7a. When the flap 33 is in the state indicated by the virtual line and the reference sign 33-1 in FIG. 2, the medium is guided to the face-up transport path R5 and is discharged from the discharge tray 7 along the discharge trajectory T1. At this time, the discharge tray 7 is in the open state (not illustrated).

A medium feeding path in which a medium is transported to a resist roller pair 17 located on the upstream of a printing head 8 in the medium transport path in which the medium is transported inside the printing apparatus 1 will be described with reference to FIG. 2.

The medium cassette 10A is detachably provided from the apparatus body 2A. The medium cassette 10A includes a hopper 11. When the hopper 11 swings around the shaft 11a, a medium accommodated in the medium cassette 10A is brought into contact with and separated from a feeding roller 12 which is rotationally driven by a motor (not illustrated). The medium delivered from the medium cassette 10A by the feeding roller 12 is separated by passing through a nip position by a separation roller pair 13. Then, the medium is transported by receiving the feeding force from a transport roller pair 14, and reaches a resist roller pair 17. This prevents so-called double feeding in which a plurality of media accommodated in the medium cassette 10A are transported with being stacked. Here, although not illustrated in FIG. 2, similarly, the expansion units 2B and 2C located on the lower side of the apparatus body 2A also have the feeding roller 12 and the separation roller pair 13, and a medium delivered from each of the medium cassettes 10B and 10C is transported by receiving the feeding force from the transport roller pair 14 illustrated in FIG. 2, and reaches the resist roller pair 17.

The feeding unit 35 includes a manual feeding tray 41 on the inner side of the opening/closing cover 6. The manual feeding tray 41 rotates about the swing shaft 41a and can be opened and closed together with the opening/closing cover 6. The opening/closing cover 6 is rotated around the swing shaft 6a and opened, and the manual feeding tray 41 is rotated around the swing shaft 41a and opened, so that the manual feeding tray 41 turns into an open state (not illustrated) and a medium can be manually fed by the user. A feeding roller 15 and a separation roller 16 are provided along the feeding trajectory S3 in which the medium is transported from the manual feeding tray 41. Then, the medium set in the manual feeding tray 41 is transported by the rotation of the feeding roller 15 and the separation roller 16 and reaches the resist roller pair 17.

Figure 3:
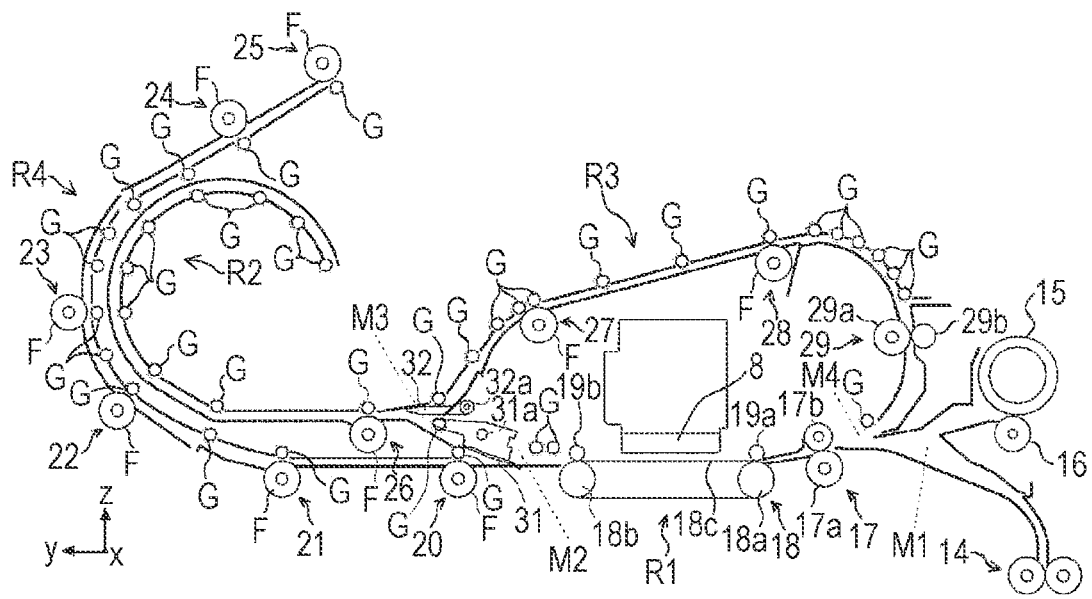
FIG. 3 is a diagram illustrating an example of a medium discharge path.

Next, the medium discharge path on a downstream of the resist roller pair 17 among the medium transport paths in which the medium is transported inside the printing apparatus 1 will be described with reference to FIG. 3. FIG. 3 is a diagram illustrating an example of the medium discharge path on the downstream of the resist roller pair 17. In the following description, a case where a medium is discharged to the discharge tray 4 through the face-down transport path R4 will be described.

In describing an example of the medium discharge path, first, a plurality of rollers provided in the medium discharge path will be described. As illustrated in FIG. 3, transport roller pairs 20 to 24 and 26 to 29 and a discharging roller pair 25 are provided in the medium discharge path. The transport roller pairs 20 to 24 and 26 to 29 are roller pairs for transporting a medium along the medium discharge path. The discharging roller pair 25 is a roller pair for discharging the medium transported along the medium discharge path to the discharge tray 4.

In FIG. 3, a roller on one side of each roller pair other than the resist roller pair 17 and the transport roller pair 29 is illustrated with the reference sign F, and the other roller is illustrated with the reference sign G. The roller F is a drive roller driven by a motor (not illustrated), and is, for example, a plurality of rubber rollers provided at appropriate intervals in the width direction of the medium. The roller G is a driven roller that can nip the medium between the roller G and the roller F by a biasing section (not illustrated) and that is driven to rotate in contact with the medium. The roller G is provided as a pair with the roller F at an appropriate interval in the width direction of the medium. The roller G is a jagged roller having a plurality of teeth on the outer periphery thereof. By making point contact with the print surface of the medium, it is possible to reduce the possibility that white spots or transfer occur in an image printed on the medium. The roller G may be provided at an appropriate position on the medium transport path in addition to forming the transport roller pairs 20 to 24 and 26 to 28, and the discharging roller pair 25. In this case, the roller G may be provided on the side in contact with the nearest print surface.

The resist roller pair 17 and the transport roller pair 29 have different configurations from the transport roller pairs 20 to 24 and 26 to 28, and the discharging roller pair 25. Specifically, the transport roller pair 29 includes a drive roller 29a that is rotationally driven and a driven roller 29b that is pressed toward the drive roller 29a and is capable of driven rotation. The driven roller 29b of the above rollers is a resin roller having a smooth outer peripheral surface. The resist roller pair 17 includes a drive roller 17a that is rotationally driven and a driven roller 17b that is pressed toward the drive roller 17a by a biasing section (not illustrated) and is capable of driven rotation. The drive roller 17a of the above rollers is a roller having fine unevennesses on the outer periphery, and the driven roller 17b is a resin roller having a smooth outer peripheral surface.

The recording transport path R1 is the medium transport path that passes by the lower side of the printing head 8 that performs printing on a medium and extends from the upstream to the downstream of the printing head 8. In the present embodiment, for convenience, description will be made on the assumption that the recording transport path R1 is generally in a range from a position M1 to a position M2 illustrated in FIG. 3. In the recording transport path R1, the medium is transported by receiving the feeding force from the resist roller pair 17 and a belt unit 18, and, when the medium passes by the lower side of the printing head 8, the printing head 8 performs the printing process on the medium.

The switchback transport path R2 is the medium transport path coupled to the recording transport path R1. In the switchback transport path R2, a medium that has passed by the lower side of the printing head 8 is fed and the fed medium is switched back, and thus the medium is transported in an opposite direction of the fed direction. Such a switchback transport path R2 is located on the inner side of the curved face-down transport path R4 described later. In the present embodiment, for convenience, description will be made on the assumption that the switchback transport path R2 is generally in a range on the left side of a position M3 illustrated in FIG. 3. In the switchback transport path R2, the medium is transported by receiving the feeding force from the transport roller pair 26.

The reverse transport path R3 is the medium transport path coupled to the switchback transport path R2. After the medium after being switched back in the switchback transport path R2 is bypassed to pass by the upper side of the printing head 8, the reverse transport path R3 is merged with the recording transport path R1 on the upstream of the printing head 8. In the present embodiment, for convenience, description will be made on the assumption that the reverse transport path R3 is generally in a range from the position M3 to a position M4 illustrated in FIG. 3. In the reverse transport path R3, the medium is transported by receiving the feeding force from the transport roller pairs 27 to 29.

The face-down transport path R4 is the medium transport path coupled to the recording transport path R1 and is a path in which the medium that has passed by the lower side of the printing head 8 is curved and inverted with the surface facing the printing head 8 set as the inner side, and, in this state, the medium is discharged to the discharge tray 4. In the present embodiment, for convenience, description will be made on the assumption that the face-down transport path R4 is generally in a range on the left side of the position M2 illustrated in FIG. 3. In the face-down transport path R4, the medium is transported by receiving the feeding force from the transport roller pairs 20 to 24 and the discharging roller pair 25.

A flap 31 and a flap 32 are provided at coupling portions between the recording transport path R1, the switchback transport path R2, the reverse transport path R3, the face-down transport path R4, and the face-up transport path R5. The flap 31 and the flap 32 function as a path switching member that switches the medium transport path. The flap 31 can swing around a swing fulcrum 31a by receiving a driving force from a drive section (not illustrated). The flap 32 is provided to be capable of being engaged with the flap 31 through an engaging portion (not illustrated), and swings around a swing fulcrum 32a in response to the swing of the flap 31. The medium transport path in which the medium is transported is set by the flaps 31 and 32.

Figure 4:
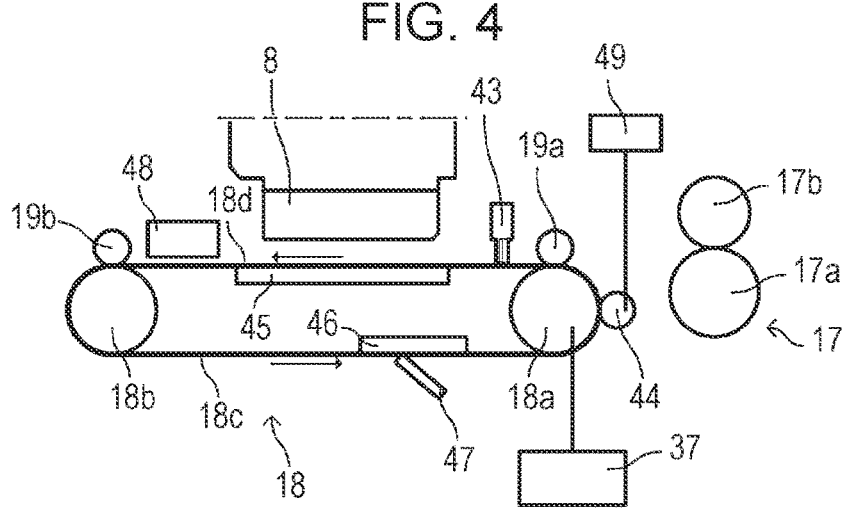
FIG. 4 is a diagram illustrating an example of a structure around a recording transport path.

Next, the configuration around the recording transport path R1 will be described with reference to FIG. 4. FIG. 4 is a diagram illustrating an example of the structure around the recording transport path R1. In the printing apparatus 1, when a medium passes by the lower side of the printing head 8 in the recording transport path R1, the printing head 8 performs a printing process on the medium. That is, the recording transport path R1 corresponds to a region in which the printing process is performed on the medium in the medium transport path.

As illustrated in FIG. 4, the recording transport path R1 includes the resist roller pair 17 and the belt unit 18 for transporting a medium. The belt unit 18 includes a drive pulley 18a, a driven pulley 18b, and a transport belt 18c. The transport belt 18c is an endless belt in which a charging material that stores electric charges is contained or applied on a base material made of urethane, rubber, or the like. The transport belt 18c is hung on the drive pulley 18a on the upstream of the recording transport path R1 and is hung on the driven pulley 18b on the downstream of the recording transport path R1. A predetermined tension is applied to the transport belt 18c by a tensioner (not illustrated). When the drive pulley 18a is rotationally driven by a motor 37, the transport belt 18c is rotationally driven, and the medium supported by the transport belt 18c is transported.

Support plates 45 and 46 are provided on the inner side of the transport belt 18c. The transport belt 18c is provided in a state where the inward bending is restricted by the support plates 45 and 46. The support plates 45 and 46 are formed of a conductive material such as metal and are grounded.

A charging roller 44 is provided at a position facing the drive pulley 18a with the transport belt 18c interposed therebetween. The charging roller 44 is in contact with the outer surface of the transport belt 18c. The charging roller 44 is driven to rotate in response to the operation of the transport belt 18c. A high-voltage DC voltage is supplied to the charging roller 44 from a power supply device 49 described later. Thus, electric charges are supplied to the transport belt 18c in contact with the charging roller 44 through the charging roller 44, and as a result, the electric charges are stored in the transport belt 18c.

The medium supported by the transport belt 18c is attracted to the belt unit 18 by the electric charges stored through the charging roller 44. In the following description, the outer surface of the transport belt 18c on which the medium of the belt unit 18 is attracted and is located to face the printing head 8 may be referred to as an attraction surface 18d.

A driven roller 19a is provided on the upper side of the drive pulley 18a with the transport belt 18c interposed therebetween. A driven roller 19b is provided on the upper side of the driven pulley 18b with the transport belt 18c interposed therebetween. The medium transported by the transport belt 18c is pressed against the transport belt 18c by the driven rollers 19a and 19b. Thus, the medium is in close contact with the attraction surface 18d. The driven rollers 19a and 19b are made of a conductive material such as metal and are grounded.

An erasing brush 43 that comes into contact with the medium is provided on the upstream of the printing head 8. The erasing brush 43 removes the electric charge on the upper surface of the medium and the electric charge on the outer surface of the transport belt 18c, that is, the attraction surface 18d. Specifically, when the electric charges are stored in the attraction surface 18d of the transport belt 18c by the charging roller 44, charges having a polarity opposite to the polarity of charges in the attraction surface 18d are generated in the surface of the medium, which is in contact with the attraction surface 18d. Thus, charges having a polarity opposite to the polarity of charges on the surface on which the medium and the attraction surface 18d are in contact with each other are generated in the print surface which is on the opposite side of the medium and is subjected to the printing process by the printing head 8. The erasing brush 43 removes the electric charges stored on the print surface of the medium. Thus, only the electric charges in the surface of the medium in contact with the transport belt 18c remain. As a result, the medium is attracted to the attraction surface 18d. Such an erasing brush 43 may be made of a material capable of removing electric charges from the medium and the transport belt 18c, and is formed of, for example, a resin material such as conductive nylon.

A heating heater 48 is provided on the downstream of the printing head 8. The heating heater 48 heats the medium on which the printing process has been performed by the printing head 8 to fix the image formed on the medium on the medium. The heating heater 48 may be provided on the upstream in addition to the downstream of the printing head 8, or may be located on the inner side of the transport belt 18c. That is, the printing apparatus 1 includes the heating heater 48 that heats the medium. The heating heater 48 is an example of a heating section.

A cleaning blade 47 is provided on the lower side of the belt unit 18 to interpose the transport belt 18c with the support plate 46. The cleaning blade 47 wipes the attraction surface 18d of the transport belt 18c to remove an ink, foreign matters, and the like adhering to the attraction surface 18d.

As described above, in the printing apparatus 1 in the present embodiment, the medium accommodated in the medium cassette 10A, 10B, or 10C or the medium supplied from the feeding unit 35 is transported along the medium transport path. When the medium is transported to the recording transport path R1, the printing head 8 performs the printing process on the medium. Then, the medium on which the printing process has been performed is discharged from the discharge tray 4 via the face-down transport path R4.

2. Functional Configuration of Printing Apparatus

Figure 5:
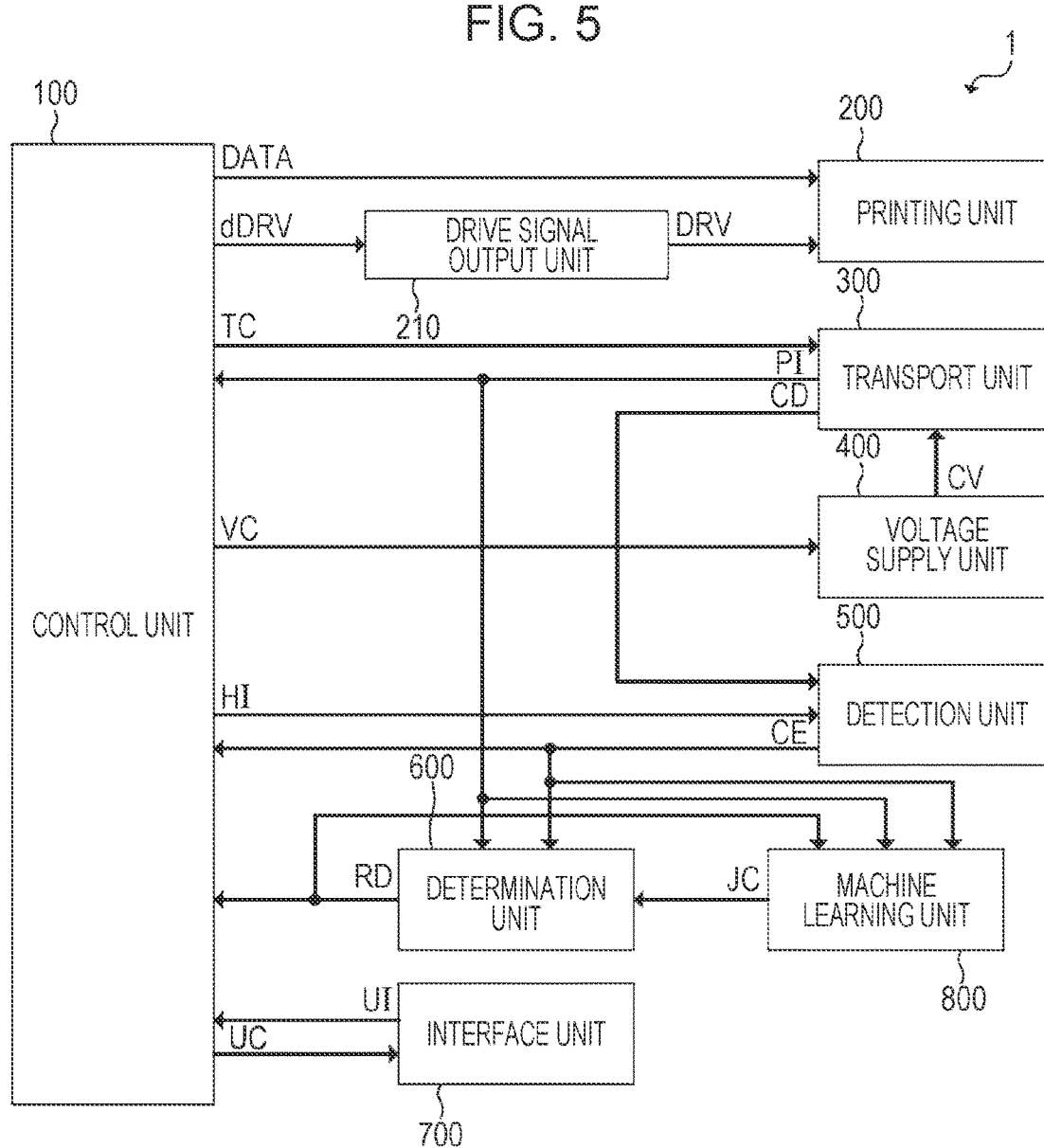
FIG. 5 is a diagram illustrating an example of a functional configuration of the printing apparatus.

Next, the functional configuration of the printing apparatus 1 will be described. FIG. 5 is a diagram illustrating an example of the functional configuration of the printing apparatus 1. As illustrated in FIG. 5, the printing apparatus 1 includes a control unit 100, a printing unit 200, a drive signal output unit 210, a transport unit 300, a voltage supply unit 400, a detection unit 500, a determination unit 600, an interface unit 700, and a machine learning unit 800.

The printing apparatus 1 performs the printing process on a medium based on operation information input by the user operating the interface unit 700 and image data supplied by the user operating an external device such as a host computer communicably coupled via the interface unit 700. That is, the interface unit 700 functions as a user interface that receives the operation information from the user who operates the printing apparatus 1. Such an interface unit 700 includes the operation panel 5 described above, a communication port for communicably coupling the printing apparatus 1 and an external device to each other, and the like. The interface unit 700 generates an operation information signal UI containing operation information and image data based on the operation by the user, and outputs the operation information signal UI to the control unit 100.

The control unit 100 outputs various control signals for controlling the printing unit 200, the drive signal output unit 210, the transport unit 300, the voltage supply unit 400, the detection unit 500, the determination unit 600, and the interface unit 700, based on the input operation information signal UI.

Specifically, the control unit 100 generates a printing control data signal DATA based on the operation information signal UI and outputs the generated printing control data signal DATA to the printing unit 200. In addition, the control unit 100 generates a basic drive signal dDRV and outputs the generated basic drive signal dDRV to the drive signal output unit 210. The drive signal output unit 210 generates a drive signal DRV for driving a drive element to be driven when the printing unit 200 forms an image on a medium, based on the input basic drive signal dDRV. Then, the drive signal output unit 210 outputs the generated drive signal DRV to the printing unit 200.

Here, when the printing apparatus 1 is a so-called ink jet printer that forms an image on a medium by discharging an ink to the medium, as the drive element driven by the drive signal DRV, for example, a piezoelectric element and a heating element can be used. Regarding the piezoelectric element, the piezoelectric element deforms in accordance with the drive signal DRV and thus the internal volume of a cavity with which an ink is filled is changed. Thus, the ink is discharged from a nozzle. Regarding the heating element, the heating element generates heat in accordance with the drive signal DRV, and thus the internal pressure of the cavity with which the ink is filled is changed. Thus, the ink is discharged from the nozzle.

The printing unit 200 includes the printing head 8 described above. The printing unit 200 forms dots of a desired size on a medium, based on the printing control data signal DATA input from the control unit 100 and the drive signal DRV input from the drive signal output unit 210. Specifically, the printing head 8 of the printing unit 200 supplies the drive signal DRV to the drive element at a timing based on the printing control data signal DATA, and thus an ink is discharged to the medium at a desired timing defined by the printing control data signal DATA. The printing unit 200 is an example of a printing section that performs printing on a medium such as stucco paper containing calcium carbonate.

The control unit 100 generates a transport control signal TC for controlling the transport of a medium, and outputs the transport control signal TC to the transport unit 300. The transport unit 300 transports the medium along a predetermined medium transport path based on the input transport control signal TC. That is, the transport unit 300 includes the feeding roller 12 and the separation roller pair 13 that form the medium feeding path described above, the transport roller pairs 20 to 24 and 26 to 29, discharging roller pair 25, the resist roller pair 17, and the belt unit 18 that form the medium discharge path. The transport unit 300 drives various motors including the above-described motor 37 based on the transport control signal TC input from the control unit 100, and thus the transport unit 300 drives various rollers including the transport roller pairs 20 to 24 and 26 to 29, and the discharging roller pair 25, and the resist roller pair 17, and rotationally drives the transport belt 18c in the belt unit 18. Thus, the transport unit 300 transports the medium along the medium transport path. The transport unit 300 that rotationally drives the transport belt 18c that forms at least a portion of the medium transport path on which the medium is transported is an example of a transport section.

The transport unit 300 generates a position information signal PI indicating the transport position of the medium and the rotation position of the transport belt 18c, and outputs the position information signal PI to the control unit 100. The control unit 100 generates a printing control data signal DATA corresponding to the transport position of the medium, based on the position information signal PI input from the transport unit 300. Then, the control unit 100 outputs the printing control data signal DATA to the printing unit 200. Thus, the printing unit 200 can discharge an ink to the medium at a timing synchronized with the transport of the medium. As a result, a desired ink lands on the medium and a desired image is formed on the medium.

Here, the position information signal PI output by the transport unit 300 may be a signal generated based on, for example, encoder information output by an encoder or the like, or may be a signal generated based on sensor detection information detected by a sensor element (not illustrated) provided at a predetermined position of the transport unit 300. Further, the position information signal PI output by the transport unit 300 may individually include a position information signal PI indicating the transport position of the medium and a position information signal PI indicating the rotation position of the transport belt 18c.

The control unit 100 outputs a voltage value control signal VC to the voltage supply unit 400. The voltage supply unit 400 generates a charging control voltage CV having a voltage value defined by the input voltage value control signal VC, and supplies the charging control voltage CV to the charging roller 44 in the transport unit 300. Thus, electric charges corresponding to the charging control voltage CV are supplied to the transport belt 18c via the charging roller 44, and the electric charges corresponding to the charging control voltage CV are stored in the transport belt 18c. That is, the charging control voltage CV corresponds to the high-voltage DC voltage that is the basis of the electric charges stored in the above-described transport belt 18c, and the voltage supply unit 400 includes the power supply device 49 that outputs the high-voltage DC voltage. The charging control voltage CV supplied to the charging roller 44 for charging the transport belt 18c is an example of a charging voltage. The voltage supply unit 400 that supplies the charging control voltage CV to the charging roller 44 is an example of a voltage supply section.

The transport unit 300 generates a charging detection voltage CD corresponding to the amount of electric charges stored in the transport belt 18c based on the charging control voltage CV output by the voltage supply unit 400. Then, the transport unit 300 outputs the charging detection voltage CD to the detection unit 500.

The detection unit 500 detects, based on the input charging detection voltage CD, whether or not the amount of electric charges charged on the transport belt 18c is normal, that is, whether or not a voltage value charged to the transport belt 18c is normal. Then, the detection unit 500 generates a charging voltage determination signal CE indicating the detection result. In other words, the detection unit 500 detects whether or not charging abnormality has occurred in the transport belt 18c. The detection unit 500 outputs a charging voltage determination signal CE indicating whether or not charging abnormality has occurred in the transport belt 18c, to the control unit 100, the determination unit 600, and the machine learning unit 800.

Figure 6:
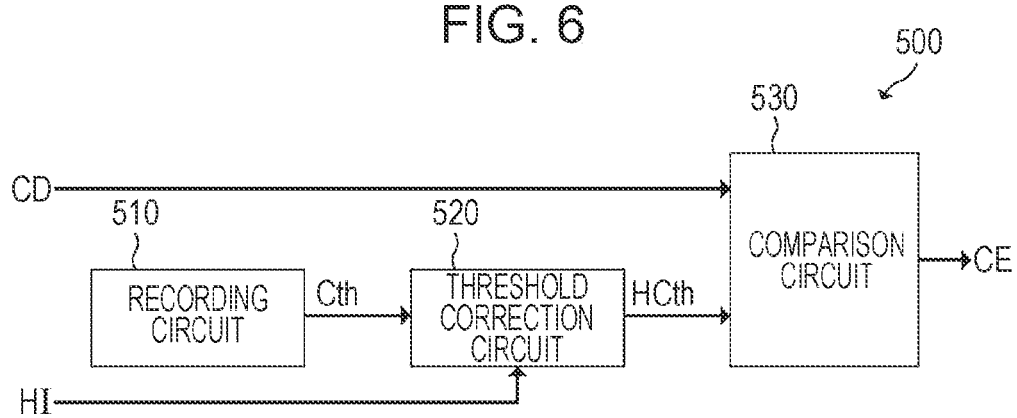
FIG. 6 is a diagram illustrating a functional configuration of a detection unit.

Here, a specific example of the configuration of the detection unit 500 will be described with reference to FIG. 6. FIG. 6 is a diagram illustrating a functional configuration of the detection unit 500. As illustrated in FIG. 6, the detection unit 500 includes a recording circuit 510, a threshold correction circuit 520, and a comparison circuit 530.

In the detection unit 500, threshold information Cth for detecting whether or not charging abnormality has occurred in the transport belt 18c is recorded in the recording circuit 510. The threshold information Cth recorded in the recording circuit 510 is read out by the threshold correction circuit 520. Threshold correction information HI output by the control unit 100 is input to the threshold correction circuit 520. The threshold correction circuit 520 corrects the threshold information Cth read from the recording circuit 510 based on the threshold correction information HI input from the control unit 100, and outputs correction threshold information HCth as the corrected threshold information Cth to the comparison circuit 530. That is, the threshold correction circuit 520 corrects the threshold information Cth.

The comparison circuit 530 compares the correction threshold information HCth corresponding to the corrected threshold information Cth with the charging detection voltage CD indicating the amount of electric charges charged on the transport belt 18c of the transport unit 300, thereby detecting whether or not charging abnormality has occurred in the transport belt 18c. The comparison circuit 530 outputs the charging voltage determination signal CE in accordance with the comparison result to the control unit 100, the determination unit 600, and the machine learning unit 800.

Here, in the present embodiment, description will be made on the assumption that the comparison circuit 530 outputs a high-level charging voltage determination signal CE indicating that charging abnormality has occurred in the transport belt 18c when the charging detection voltage CD exceeds the correction threshold information HCth, and outputs a low-level charging voltage determination signal CE indicating that charging abnormality does not occur in the transport belt 18c when the charging detection voltage CD is lower than the correction threshold information HCth. The comparison circuit 530 may determines that charging abnormality has occurred in the transport belt 18c when the charging detection voltage CD is lower than the correction threshold information HCth, and may determine that charging abnormality does not occur in the transport belt 18c when the charging detection voltage CD exceeds the correction threshold information HCth. Further, the comparison circuit 530 may output the low-level charging voltage determination signal CE when the charging abnormality has occurred in the transport belt 18c, and may output the high-level charging voltage determination signal when the charging abnormality does not occur in the transport belt 18c.

Here, the detection unit 500 that detects whether or not charging abnormality has occurred in the transport belt 18c is an example of a detection section. The recording circuit 510 in the detection unit 500 is an example of a recording unit. The threshold correction circuit 520 is an example of a threshold correction unit. The comparison circuit 530 is an example of a comparison unit.

Returning to FIG. 5, the position information signal PI indicating the rotation position of the transport belt 18c, the charging voltage determination signal CE indicating the detection result of the detection unit 500, and the determination result signal RD indicating the determination result in the determination unit 600 described later are input to the machine learning unit 800. The machine learning unit 800 performs machine learning of a determination condition in the determination unit 600 and generates a determination condition signal JC in accordance with a learning result, based on a learning model in which the rotation amount of the transport belt 18c, which is calculated from the input position information signal PI, and the charging voltage determination signal CE indicating the detection result of the detection unit 500. Then, the machine learning unit 800 outputs the determination condition signal JC to the determination unit 600.

Figure 7:
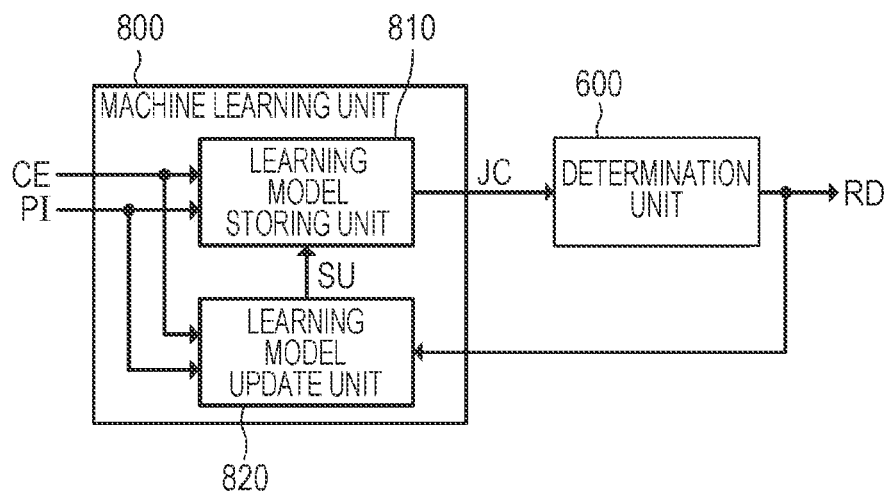
FIG. 7 is a diagram illustrating an example of a configuration of a machine learning unit.

FIG. 7 is a diagram illustrating an example of a configuration of the machine learning unit 800. As illustrated in FIG. 7, the machine learning unit 800 includes a learning model storing unit 810 and a learning model update unit 820. The position information signal PI and the charging voltage determination signal CE are input to the learning model storing unit 810. The learning model storing unit 810 stores the learning model in which the rotation amount of the transport belt 18c, which is calculated from the position information signal PI, and the charging voltage determination signal CE output by the detection unit 500 are associated with each other. The learning model storing unit 810 generates a determination condition signal JC based on the rotation amount of the transport belt 18c, which is calculated from the input position information signal PI, the charging voltage determination signal CE indicating the detection result of the detection unit 500, and the stored learning model, and. Then, the learning model storing unit 810 outputs the determination condition signal JC to the determination unit 600.

The position information signal PI, the charging voltage determination signal CE, and the determination result signal RD are input to the learning model update unit 820. The learning model update unit 820 generates learning model update information SU based on the position information signal PI, the charging voltage determination signal CE, and the determination result signal RD, and outputs the learning model update information SU to the learning model storing unit 810. The learning model storing unit 810 generates a new learning model by performing machine learning based on the stored learning model and the learning model update information SU input from the learning model update unit 820. In addition, the learning model storing unit 810 updates the learning model to be stored.

As described above, the machine learning unit 800 performs machine learning of the determination condition in the determination unit 600 based on the learning model in which the rotation amount of the transport belt 18c and the detection result of the detection unit 500 are associated with each other. The machine learning unit 800 generates the determination condition signal JC based on the learning model generated by the machine learning, the rotation amount of the transport belt 18c, which is calculated from the input position information signal PI, and the charging voltage determination signal CE indicating the detection result of the detection unit 500. Then, the machine learning unit 800 outputs the generated determination condition signal JC to the determination unit 600. Here, the machine learning unit 800 is an example of a machine learning section.

The charging voltage determination signal CE output by the detection unit 500, the position information signal PI indicating the rotation position of the transport belt 18c output by the transport unit 300, and the determination condition signal JC output by the machine learning unit 800 are input to the determination unit 600. The determination unit 600 determines whether or not charging abnormality has occurred in the transport belt 18c, based on the charging voltage determination signal CE and the position information signal PI, and the determination condition signal JC. When the charging abnormality has occurred in the transport belt 18c, the determination unit 600 determines the cause of the charging abnormality occurred in the transport belt 18c. The determination unit 600 generates a determination result signal RD indicating the determination result and outputs the determination result signal RD to the control unit 100 and the machine learning unit 800.

Here, the cause of the charging abnormality that may occur in the transport belt 18c and is determined by the determination unit 600 will be described. The charging abnormality that may occur in the transport belt 18c includes charging abnormality caused by abnormality in the voltage supply unit 400 that outputs the charging control voltage CV for storing the electric charges in the transport belt 18c, and charging abnormality caused by a scratch and the like on the transport belt 18c in which the electric charges are charged.

When charging abnormality has occurred due to an occurrence of abnormality in the voltage supply unit 400, there is a concern that the abnormality spreads to each component of the printing apparatus 1 because the voltage supply unit 400 outputs a high-voltage DC voltage. Therefore, the printing apparatus 1 stops the printing process in the printing unit 200. On the other hand, when the charging abnormality occurs due to a scratch or the like on the transport belt 18c with charged electric charges, electric charge distribution stored in the transport belt 18c may vary, but there is a low concern that the abnormality spreads to each component of the printing apparatus 1. Thus, considering the convenience of the user, the printing unit 200 preferably continues the printing process. That is, the printing apparatus 1 is required to change the control in accordance with the cause of the charging abnormality occurring in the transport belt 18c.

Therefore, in the printing apparatus 1 in the present embodiment, the determination unit 600 determines whether or not the charging abnormality has occurred in the transport belt 18c, based on the charging voltage determination signal CE, the position information signal PI, and the determination condition signal JC, and, when the discharging abnormality has occurred in the transport belt 18c, the determination unit 600 determines whether the cause of the charging abnormality is due to abnormality of the voltage supply unit 400 or due to scratches or the like on the transport belt 18c. The control unit 100 controls each component of the printing apparatus 1 based on the determination result in the determination unit 600, so that a concern that the operation stability of the printing apparatus 1 is deteriorated due to the charging abnormality occurring in the transport belt 18c is decreased.

In particular, in the printing apparatus 1 that performs printing on a medium containing calcium carbonate and uses stucco paper coated with stucco as the medium, as with the printing apparatus 1 in the present embodiment, calcium carbonate and the like contained in the medium are accumulated inside the printing apparatus 1 with the printing process for a long period. Moisture in the air and moisture contained in the ink as an example of a printing material reacts with the accumulated calcium carbonate, so that the calcium carbonate is coagulated and adheres to the transport belt 18c. The adhering calcium carbonate is interposed between the transport belt 18c and various rollers, so that the transport belt 18c is damaged. That is, in the printing apparatus 1 that performs printing on a medium containing calcium carbonate and uses stucco paper coated with stucco as the medium, there is an increased concern of damaging the transport belt 18c, such as scratches. As a result, there is an increased concern that the printing process is unintentionally stopped in the printing apparatus 1.

In response to such a problem, the determination unit 600 determines whether the cause of the charging abnormality occurring in the transport belt 18c is the abnormality of the voltage supply unit 400, the abnormality of the transport belt 18c, or not the abnormality of the voltage supply unit 400 and the transport belt 18c, based on the determination condition signal JC, the position information signal PI, and the charging voltage determination signal CE. In addition, the control unit 100 controls the operation of the printing apparatus 1 in accordance with the determination result of the determination unit 600. Thus, it is possible to reduce a concern that the abnormality caused by the charging abnormality of the transport belt 18c spreads to each component of the printing apparatus 1 and to reduce a concern that the printing process is unintentionally stopped. That is, the operational stability of the printing apparatus 1 is improved. A specific example of the determination operation in the determination unit 600 will be described later. Here, the determination unit 600 is an example of a determination section.

Here, an example of the operation of the control unit 100 that controls the operation of each component of the printing apparatus 1 based on the determination result signal RD input from the determination unit 600 will be described.

When the determination result signal RD input to the control unit 100 indicates that the cause of the charging abnormality occurring in the transport belt 18*c* is due to the abnormality of the voltage supply unit 400, the control unit 100 generates a printing control data signal DATA for stopping the printing process and outputs the generated printing control data signal DATA to the printing unit 200. Thus, the printing unit 200 stops the printing process. That is, when the determination unit 600 determines that the cause of the charging abnormality occurring in the transport belt 18*c* is the abnormality of the voltage supply unit 400, the printing unit 200 stops printing on the medium.

The voltage supply unit 400 generates a high-voltage DC voltage as the charging control voltage CV and supplies the generated high-voltage DC voltage to the transport belt 18*c* via the charging roller 44. When the printing process in the printing unit 200 is continued in a state where abnormality has occurred in such a voltage supply unit 400 that generates the high-voltage DC voltage, there is a concern that the abnormality of the voltage supply unit 400 spreads to even the component that normally operates in the printing apparatus 1, due to the high-voltage charging control voltage CV output by the voltage supply unit 400. In response to such a problem, when abnormality has occurred in the voltage supply unit 400 that outputs a high-voltage DC voltage, the control unit 100 stops the printing process in the printing unit 200. In this manner, it is possible to reduce a concern that the abnormality occurring in the voltage supply unit 400 spreads to other components of the printing apparatus 1.

When the determination result signal RD input to the control unit 100 indicates that the cause of the charging abnormality occurring in the transport belt 18*c* is due to the abnormality of the transport belt 18*c*, the control unit 100 generates an operation unit control signal UC for displaying warning information indicating that abnormality has occurred in the transport belt 18*c*. Then, the control unit 100 outputs the operation unit control signal UC to the interface unit 700. Thus, the warning information indicating that the abnormality has occurred in the transport belt 18*c* is displayed on the display unit of the operation panel 5 in the interface unit 700. That is, when the determination unit 600 determines that the cause of the charging abnormality occurring in the transport belt 18*c* is the abnormality of the transport belt 18*c*, the control unit 100 reports the warning information to the user through the display unit in the operation panel 5 in the interface unit 700. The report unit that reports the warning information to the user may be a sound output unit such as a speaker that reports the warning information to the user by sound, in addition to the display unit such as a liquid crystal panel or a touch panel.

As described above, when the cause of the charging abnormality occurring in the transport belt 18*c* is due to the abnormality of the transport belt 18*c*, there is a low concern that the abnormality spreads to other components of the printing apparatus 1, as compared to a case where the abnormality has occurred in the voltage supply unit 400. Thus, from the viewpoint of not impairing the convenience of the user, when the charging abnormality occurring in the transport belt 18*c* is due to the abnormality of the transport belt 18*c*, it is preferable that the printing apparatus 1 continuously perform the printing process in the printing unit 200.

Therefore, when the determination unit 600 determines that the cause of the charging abnormality occurring in the transport belt 18*c* is due to the abnormality of the transport belt 18*c*, the control unit 100 generates and outputs the operation unit control signal UC for reporting, to the user, warning information indicating that the abnormality has occurred in the transport belt 18*c*, so that the user can replace the transport belt 18*c* at any timing that does not adversely affect the printing process. That is, it is possible to reduce the concern that the printing process in the printing apparatus 1 is unintentionally stopped due to the abnormality of the transport belt 18*c*, and to reduce the concern that the convenience of the user is impaired.

Further, when the input determination result signal RD contains information indicating that charging abnormality has occurred in the transport belt 18*c*, the control unit 100 may generate a voltage value control signal VC for changing the voltage value of the charging control voltage CV and output the voltage value control signal VC to the voltage supply unit 400. That is, the voltage value of the charging voltage charged on the transport belt 18*c* may be adjusted in accordance with the determination result in the determination unit 600.

Because the control unit 100 controls the voltage value of the charging control voltage CV supplied to the charging roller 44 in accordance with the determination result of the determination unit 600, the charging voltage charged on the transport belt 18*c* can be adjusted to a potential at which the detection unit 500 does not detect the charging abnormality. Thus, it is possible to temporarily eliminate the occurrence of charging abnormality in the transport belt 18*c*. As a result, when the printing unit 200 continuously performs the printing process, it is possible to reduce a concern that the warning information is continuously reported and to remove the cause of the charging abnormality at any timing by the user. This reduces the concern that the convenience of the user is impaired due to the unintentional stoppage of the printing process.

In this case, the control unit 100 may report, to the user, a message indicating that the charging voltage of the transport belt 18*c* is adjusted, via the report unit such as the display unit in the operation panel 5 of the interface unit 700. Thus, the user can perform various measures for eliminating the occurrence of the charging abnormality at the optimum timing without forgetting to perform various measures for eliminating the occurrence of the charging abnormality in the transport belt 18*c*.

When the determination result signal RD input to the control unit 100 indicates that the cause of the charging abnormality occurring in the transport belt 18*c* is due to the abnormality of the transport belt 18*c*, the control unit 100 may generate threshold correction information HI for correcting the threshold information Cth to alleviate the detection of the charging abnormality and output the threshold correction information HI to the threshold correction circuit 520 in the detection unit 500. That is, when the determination unit 600 determines that the cause of the charging abnormality occurring in the transport belt 18*c* is the abnormality of the transport belt 18*c*, the threshold correction circuit 520 may correct the threshold information Cth to alleviate the detection of the charging abnormality.

Thus, when the cause of the charging abnormality occurring in the transport belt 18*c* is due to the abnormality of the transport belt 18*c*, the troublesomeness due to the continuous report of the alarm information to the user is reduced. That is, it is possible to further improve the convenience of the user who uses the printing apparatus 1. When the threshold correction circuit 520 corrects the threshold information Cth to alleviate the detection of the charging abnormality, the control unit 100 may periodically report warning information for urging the replacement of the transport belt 18*c*, via the interface unit 700. Thus, it is possible to reduce a concern that the transport belt 18c in which the charging abnormality has occurred is continuously used.

When the transport belt 18c is replaced by the user, the control unit 100 initializes the correction value for the threshold correction circuit 520 to correct the threshold information Cth, and initializes the learning result obtained by machine learning of the machine learning unit 800.

When the transport belt 18c is replaced, there is no damage caused to the transport belt 18c. As a result, it is supposed that the charging abnormality caused by the transport belt 18c is improved. Thus, by initializing the correction value of the threshold information Cth by the threshold correction circuit 520 and the learning result obtained by machine learning of the machine learning unit 800 due to the replacement of the transport belt 18c, it is possible to detect and determine whether or not the charging abnormality has occurred in the replaced transport belt 18c, regardless of the status of the transport belt 18c before the replacement. Thus, it is possible to improve the detection accuracy of the charging abnormality.

3. Determination of Cause of Charging Abnormality by Determination Unit

Next, a method in which the determination unit 600 determines whether or not charging abnormality has occurred in the transport belt 18c, and a method of, when charging abnormality has occurred in the transport belt 18c, determining whether the cause of the charging abnormality is due to the abnormality of the voltage supply unit 400 or due to the abnormality of the transport belt 18c will be described.

Figure 8:
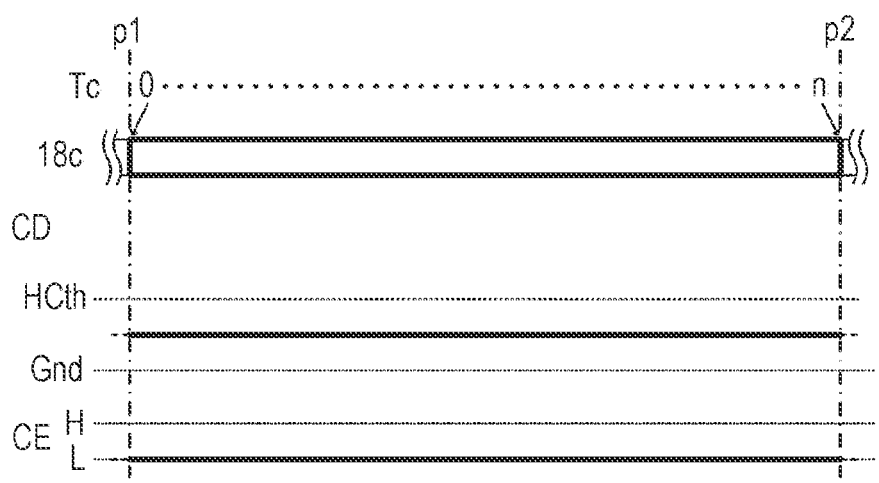
FIG. 8 is a diagram illustrating a case where charging abnormality does not occur in a region between certain positions p1 and p2 on a transport belt.
Figure 9:
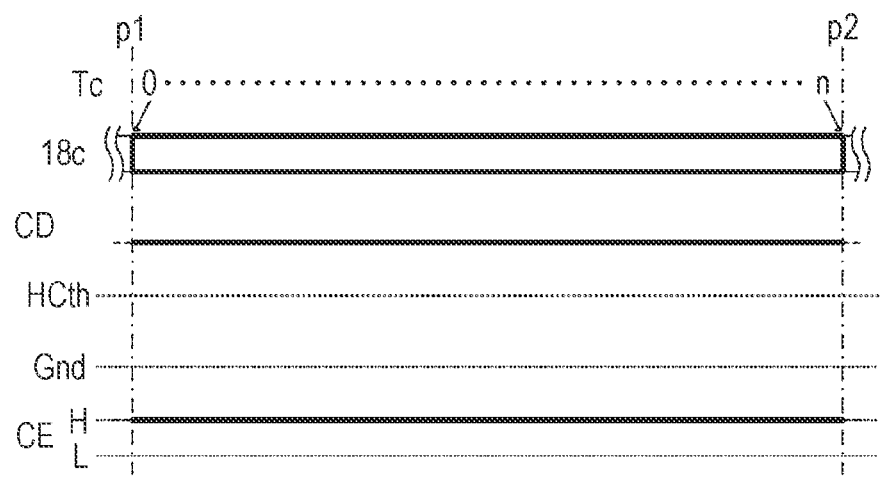
FIG. 9 is a diagram illustrating a case where the charging abnormality due to abnormality of a voltage supply unit has occurred in the region between the positions p1 and p2 on the transport belt.
Figure 10:
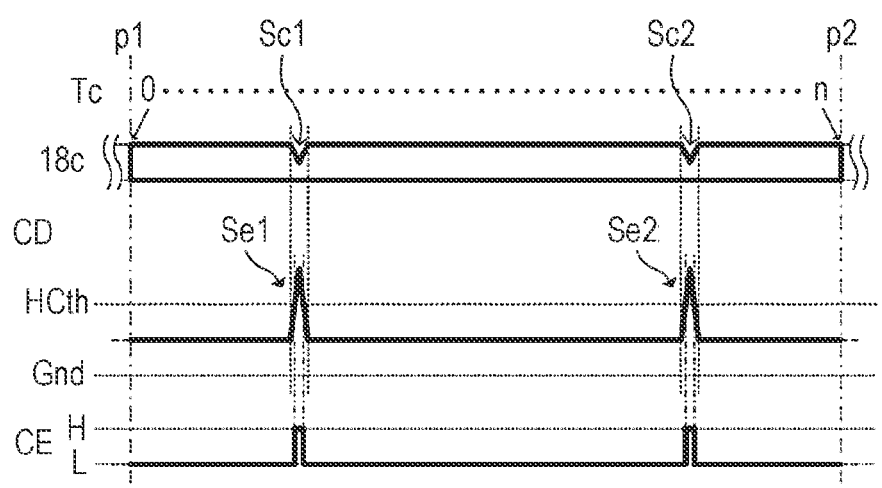
FIG. 10 is a diagram illustrating a case where the charging abnormality due to abnormality of the transport belt has occurred in the region between the positions p1 and p2 on the transport belt.

In describing the determination method in the determination unit 600, first, an example of the charging voltage determination signal CE for the occurrence/not-occurrence of charging abnormality in the transport belt 18c, which is detected by the detection unit 500, and for each cause of the charging abnormality will be described with reference to FIGS. 8 to 10. FIGS. 8 to 10 illustrate the charging detection voltage CD output from the transport unit 300 in a region between certain positions p1 and p2 on the transport belt 18c.

FIG. 8 is a diagram illustrating a case where charging abnormality does not occur in the region between the certain points p1 and p2 on the transport belt 18c. As illustrated in FIG. 8, when charging abnormality does not occur in the transport belt 18c, the charging detection voltage CD input to the detection unit 500 has a potential lower than the correction threshold information HCth. As a result, the comparison circuit 530 included in the detection unit 500 outputs a low-level charging voltage determination signal CE indicating that no charging abnormality has occurred in the transport belt 18c.

FIG. 9 is a diagram illustrating a case where the charging abnormality due to the abnormality of the voltage supply unit 400 has occurred in the region between the certain points p1 and p2 on the transport belt 18c. When abnormality has occurred in the voltage supply unit 400, the voltage supply unit 400 outputs a charging control voltage CV having a potential higher than in the normal case. Therefore, the amount of electric charges stored in the region between the certain positions p1 and p2 on the transport belt 18c also increases. As a result, as illustrated in FIG. 9, the potential of the charging detection voltage CD input to the detection unit 500 exceeds the correction threshold information HCth. As a result, the comparison circuit 530 in the detection unit 500 outputs a high-level charging voltage determination signal CE indicating that the charging abnormality has occurred in the transport belt 18c. That is, when the abnormality has occurred in the voltage supply unit 400, the detection unit 500 outputs a charging voltage determination signal CE for continuing to be at a high level in the region between the certain position p1 and p2 on the transport belt 18c.

FIG. 10 is a diagram illustrating a case where the charging abnormality due to abnormality of the transport belt 18c has occurred in the region between the certain points p1 and p2 on the transport belt 18c. As illustrated in FIG. 10, when scratches Sc1 and Sc2 are generated on the surface of the transport belt 18c as abnormality of the transport belt 18c, the surface impedance of the transport belt 18c changes due to the scratches Sc1 and Sc2. As a result, the amount of stored electric charges varies between a region in which scratches are generated in the transport belt 18c and a region in which scratches are not generated in the transport belt 18c. Thus, a pulse voltage Se1 is superimposed on the charging detection voltage CD output from the transport unit 300 in the region where the scratch Sc1 is generated in the transport belt 18c. A pulse voltage Se2 is superimposed on the charging detection voltage CD output from the transport unit 300 in the region where the scratch Sc2 is generated in the transport belt 18c. That is, when abnormality such as the scratches Sc1 and Sc2 has occurred on the transport belt 18c, the transport unit 300 outputs a charging detection voltage CD in which the pulse voltage Se1 corresponding to the scratch Sc1 and the pulse voltage Se2 corresponding to the scratch Sc2 are superimposed on the charging detection voltage CD when the charging abnormality does not occur as illustrated in FIG. 8. As a result, the comparison circuit 530 in the detection unit 500 outputs the charging voltage determination signal CE that has a high level only in the regions corresponding to the scratches Sc1 and Sc2 in the region between the certain positions p1 and p2 on the transport belt 18c.

As described above, in the printing apparatus 1 in the present embodiment, it is possible to determine whether or not charging abnormality has occurred in the transport belt 18c, by whether or not the charging detection voltage CD input to the detection unit 500 exceeds the correction threshold information HCth in the region from the position p1 to the position p2, which is a predetermined range of the transport belt 18c. In addition, when charging abnormality has occurred in the transport belt 18c, it is possible to determine whether the cause of the charging abnormality is the abnormality of the voltage supply unit 400 or the abnormality of the transport belt 18c, by how much a period for which the charging detection voltage CD input to the detection unit 500 does not exceed the correction threshold information HCth is included in the region from the position p1 to the position p2, which is the predetermined range of the transport belt 18c.

Specifically, the determination unit 600 recognizes the position of the transport belt 18c which is rotationally driven, based on the position information signal PI input from the transport unit 300, and determines whether or not the charging detection voltage CD exceeds the correction threshold information HCth, by whether the charging voltage determination signal CE input from the detection unit 500 is a high level or a low level. The determination unit 600 determines whether the cause of the charging abnormality occurring in the transport belt 18c is the abnormality of the transport belt 18c or the abnormality of the voltage supply unit 400, in accordance with a period for which the high-level charging voltage determination signal CE is input and a period for which a low-level charging voltage determination signal CE is input, in the period in which the transport belt 18c rotationally moves within a range of the region from the position p1 to the position p2 based on the position information signal PI.

In this case, the transport belt 18c is rotationally driven in accordance with the printing process of the printing apparatus 1. Therefore, the number and size of the damages including the scratches Sc1 and Sc2 generated on the transport belt 18c also change. That is, in the period in which the transport belt 18c rotationally moves within the range of the region between the position p1 and the position p2, the period for which the high-level charging voltage determination signal CE is input and the period in which the low-level charging voltage determination signal CE is input may change. In the printing apparatus 1 in the present embodiment, the machine learning unit 800 performs machine learning of the state of a damage generated on such a transport belt 18c that changes, and the machine learning unit 800 generates and output a threshold value Nth and a threshold value Eth as the determination condition signal JC in accordance with the result of the machine learning. Thus, the determination accuracy in the determination unit 600 is improved.

Here, an example of a specific method for the determination unit 600 to determine the cause of charging abnormality will be described with reference to FIG. 11. FIG. 11 is a flowchart illustrating an example of the operation of the determination unit 600. Here, in FIG. 11, the region from the position p1 to the position p2, in which the transport belt 18c is rotationally driven is divided into (n+1) pieces. In each of the divided regions, the detection unit 500 detects whether or not charging abnormality has occurred in the transport belt 18c. Then, the determination unit 600 determines whether the cause of the charging abnormality is due to the abnormality of the voltage supply unit 400 or due to the abnormality of the transport belt 18c, based on the rotation amount of the transport belt 18c, the detection result of the detection unit 500, and the determination condition signal JC.

In FIG. 11, description will be made by using the transport count Tc, a normal count Nc, and an abnormal count Ec. That is, the above count corresponds to the rotation amount of the transport belt 18c. Specifically, the transport count Tc when the detection unit 500 detects the charging detection voltage CD at the predetermined position p1 of the transport belt 18c and outputs the corresponding charging voltage determination signal CE is set to "0". The transport count Tc when the detection unit 500 detects the charging detection voltage CD at the predetermined position p2 of the transport belt 18c and outputs the corresponding charging voltage determination signal CE is set to "n".

The normal count Nc indicates the number of times of inputting the low-level charging voltage determination signal CE from the detection unit 500, for a period until the transport count Tc reaches n from 0, that is, a period for which the transport belt 18c rotates from the position p1 to the position p2. The abnormal count Ec indicates the number of times of inputting the high-level charging voltage determination signal CE from the detection unit 500, for a period until the transport count Tc reaches n from 0, that is, a period for which the transport belt 18c rotates from the position p1 to the position p2.

As illustrated in FIG. 11, the determination unit 600 initializes the transport count Tc, the normal count Nc, and the abnormal count Ec immediately before the transport belt 18c reaches the predetermined position p1 (Step S110). Specifically, all the transport count Tc, the normal count Nc, and the abnormal count Ec are set to "0".

Then, the determination unit 600 determines whether or not the transport count Tc is less than "n" (Step S120). When the transport count Tc is less than "n" (Y in Step S120), the determination unit 600 determines whether or not the charging voltage of the transport belt 18c is normal, based on the logic level of the charging voltage determination signal CE input from the detection unit 500 (Step S130).

When the charging voltage determination signal CE input from the detection unit 500 is a low level, the determination unit 600 determines that the charging voltage of the transport belt 18c is normal (Y in Step S130), and adds "1" to the normal count Nc (Step S140). Then, the determination unit 600 adds 1 to the transport count Tc by rotationally driving the transport belt 18c to move the detection position of the transport belt 18c at which the detection unit 500 detects the charging voltage (Step S160). Then, the determination unit 600 determines again whether or not the transport count Tc is less than "n" (Step S120).

When the charging voltage determination signal CE input from the detection unit 500 is a high level, the determination unit 600 determines that the charging voltage of the transport belt 18c is abnormal (N in Step S130), and adds "1" to the abnormal count Ec (Step S150). Then, the determination unit 600 adds 1 to the transport count Tc by rotationally driving the transport belt 18c to move the detection position of the transport belt 18c at which the detection unit 500 detects the charging voltage (Step S160). Then, the determination unit 600 determines again whether or not the transport count Tc is less than "n" (Step S120).

The determination unit 600 performs Steps S120 to S160 described above in all the regions between the positions p1 and p2 in the transport belt 18c. That is, the determination unit 600 repeats Steps S120 to S160 described above until the transport count Tc is equal to or more than "n". Then, when the transport count Tc is equal to or more than "n" (N in Step S120), the determination unit 600 determines whether or not the abnormal count Ec exceeds a predetermined threshold value Eth (Step S210). That is, in the period until the transport count Tc reaches "n" from "0", the determination unit 600 determines whether or not the number of times of detecting the high-level charging voltage determination signal CE indicating that the charging voltage of the transport belt 18c is abnormal exceeds the threshold value Eth.

When the abnormal count Ec is equal to or less than the threshold value Eth (N in Step S210), the determination unit 600 determines that the charging abnormality does not occur in the transport belt 18c, in the region from the position p1 to the position p2, in which the transport belt 18c is rotationally driven, in the period until the transport count Tc reaches "n" from "0". Then, the determination unit 600 outputs a determination result signal RD indicating that the charging abnormality does not occur in the transport belt 18c, to the control unit 100 (Step S250).

When the abnormal count Ec exceeds the threshold value Eth (Y in Step S210), the determination unit 600 determines that charging abnormality has occurred in the transport belt 18c in at least a portion of the region from the position p1 to the position p2, in which the transport belt 18c is rotationally driven, in the period until the transport count Tc reaches "n" from "0". Then, the determination unit 600 determines whether or not the normal count Nc exceeds a predetermined threshold value Nth (Step S220). That is, in the period until the transport count Tc reaches "n" from "0", the determination unit 600 determines whether or not the number of times of inputting the low-level charging voltage determination signal CE indicating that the charging voltage of the transport belt 18c is normal, to the determination unit 600 exceeds the threshold value Nth.

When the normal count Nc is equal to or less than the threshold value Nth (N in Step S210), the determination unit 600 determines that the cause of the charging abnormality occurring in the transport belt 18c is the abnormality of the voltage supply unit 400 because the period for which the charging abnormality does not occur in the transport belt 18c is less than the predetermined threshold value Nth, in the region from the position p1 to the position p2, in which the transport belt 18c is rotationally driven in the period until the transport count Tc reaches "n" from "0". Then, the determination unit 600 generates a determination result signal RD indicating that the cause of the charging abnormality occurring in the transport belt 18c is the abnormality of the voltage supply unit 400, and outputs the determination result signal RD to the control unit 100 (Step S240).

When the normal count Nc exceeds the threshold value Nth (Y in Step S210), the determination unit 600 determines that the cause of the charging abnormality occurring in the transport belt 18c is the abnormality of the transport belt 18c, because the period for which the charging abnormality does not occur in the transport belt 18c exceeds the predetermined threshold value Nth in the region from the position p1 to the position p2, in which the transport belt 18c is rotationally driven in the period until the transport count Tc reaches "n" from "0". The determination unit 600 generates a determination result signal RD indicating that the cause of the charging abnormality occurring in the transport belt 18c is the abnormality of the transport belt 18c, and outputs the determination result signal RD to the control unit 100 (Step S230).

Here, as described above, when determining the cause of the charging abnormality occurring in the transport belt 18c, the threshold value Nth corresponding to the normal count Nc and the threshold value Eth corresponding to the abnormal count Ec, the normal count Nc and the abnormal count Ec being used as the determination conditions by the determination unit 600, are defined by the determination condition signal JC output by the machine learning unit 800. That is, the threshold value Nth corresponding to the normal count Nc and the threshold value Eth corresponding to the abnormal count Ec are updated by the machine learning performed by the machine learning unit 800. Thus, the determination unit 600 can determine the cause of the charging abnormality by using the optimum threshold values Nth and Eth in accordance with the status of the transport belt 18c.

The region from the position p1 to the position p2, which is the predetermined range of the transport belt 18c, is preferably the entire region of the transport belt 18c. That is, the position p1 and the position p2 are the same points of the transport belt 18c, and the period of movement from the position p1 of the transport belt 18c toward the position p2 corresponds to the period for which the transport belt 18c makes one rotation. Thus, it is possible to detect whether or not the charging abnormality has occurred in the transport belt 18c, in the entire region of the transport belt 18c, and it is possible to improve the accuracy of the determination result in the determination unit 600.

As described above, in the printing apparatus 1 in the present embodiment, the machine learning unit 800 generates the determination condition signal JC containing the threshold values Nth and Eth by machine learning based on the period required for the transport belt 18c to move by a predetermined amount, and the charging voltage determination signal CE output by the detection unit 500 in this period. The determination unit 600 determines whether or not charging abnormality has occurred in the transport belt 18c based on the period required for the transport belt 18c to move by a predetermined amount, the charging voltage determination signal CE output by the detection unit 500 in this period, and the threshold values Nth and Eth in the determination condition signal JC. When the charging abnormality has occurred in the transport belt 18c, the determination unit 600 determines whether the cause of the charging abnormality is the abnormality of the voltage supply unit 400 or the abnormality of the transport belt 18c. In this manner, it is possible to improve the determination accuracy in the determination unit 600.

4. Coating of Transport Belt

Next, a coating material that covers the transport belt 18c will be described. In the printing apparatus 1 in the present embodiment, the transport belt 18c is coated with melamine resin that is unlikely to cause damage such as scratches even when calcium carbonate or the like adheres to the transport belt 18c.

A coating agent of the transport belt 18c that transports a medium is subject to a plurality of conditions because the coating agent is used in the printing apparatus 1.

As a first condition, it is required to be a substance having high resistance against organic solvents, salts, acids, alkalis and the like. There are various types of printing materials used in the printing process in the printing apparatus 1. Therefore, the transport belt 18c that transports a medium on which the printing process is performed in the printing apparatus 1 is required to have high chemical resistance that is unlikely to cause deterioration such as corrosion even when any printing material is selected.

As a second condition, high heat resistance is required. As described above, in the printing apparatus 1, after the printing process is performed on the medium, the printing material is heated by the heating heater 48 or the like in order to fix the printing material on the medium. The transport belt 18c is required to have high heat resistance that does not cause deformation or deterioration due to the heating process. Further, when the printing apparatus 1 is used in a factory or the like, the printing apparatus 1 is continuously operated for a long period. Therefore, the printing apparatus 1 is required to be made of a material that does not generate smoke, ignite, or the like even when abnormality has occurred in the printing apparatus 1 during an operating period in which the printing apparatus 1 is continuously operated for a long period. That is, the material of the transport belt 18c used in the printing apparatus 1 is required to have high heat resistance, a high heat resistance temperature that can withstand overheating by the heating heater 48 or the like, and flame retardant performance that hardly causes smoke or ignition.

In consideration of the above conditions, in the printing apparatus 1 in the related art, a material having high resistance to organic solvents, salts, acids, alkalis, and the like, which is the first condition, and high heat resistance, which is the second condition is used as the coating agent for the transport belt 18c.

However, in the printing apparatus 1 that performs printing on a medium containing calcium carbonate, the printing apparatus 1 in which the transport belt 18c on which the medium is transported is charged to increase the attraction property of the medium to the transport belt 18c, there is a problem that abnormality of the charging voltage has occurred in the transport belt 18c regardless of that the voltage supply unit 400 for storing electric charges to the transport belt 18c operates normally, and thus the printing apparatus 1 stops the printing process. In the face of the problem, the inventor found that the reason why the printing apparatus 1 stopped the printing process was that calcium carbonate contained in the medium was accumulated inside the printing apparatus 1 due to the long-term use of the printing apparatus 1, and the accumulated calcium carbonate reacted with moisture in the air and moisture contained in the printing material and coagulates, thereby damaging the transport belt 18c and, as a result, causing abnormality in the charging voltage of the transport belt 18c. In order to solve the problem that the abnormality of the charging voltage occurs in the transport belt 18c even though the voltage supply unit 400 for storing the electric charges in the transport belt 18c operates normally, the inventor found that it is effective to add the compressive strength of the coating material as a new third condition when selecting the coating material of the transport belt 18c.

FIG. 12 is a diagram illustrating an example of the coating agent that may be used for the transport belt 18c. As illustrated in FIG. 12, in the printing apparatus 1, polyethylene (PE), polypropylene (PP), poly vinylidene difluoride (PVDF), fluororesins, and melamine resins are exemplified as the material of the transport belt 18c, which satisfies two indexes of chemical resistance, which is the first condition, and heat resistance, which is the second condition. Among the above substances, polyethylene has been widely used as the coating agent for the transport belt 18c in the printing apparatus 1 in the related art from the viewpoints of cost, delivery, versatility and the like.

On the other hand, in the printing apparatus 1 that performs the printing process on a medium containing calcium carbonate, it is understood that the index of the compressive strength, which is the third condition newly found, is added, and thus, as illustrated in FIG. 12, it is more suitable to use melamine resin as the coating material of the transport belt 18c. Thus, even when the printing process is performed on the medium containing calcium carbonate for a long period, it is possible to reduce the concern of damaging the transport belt 18c due to the calcium carbonate adhering to the transport belt 18c, and to reduce a concern that charging abnormality occurs due to the abnormality of the transport belt 18c in the transport belt 18c with charged electric charges. That is, it is possible to reduce the concern that the printing apparatus 1 unintentionally stops the printing process, and to realize a stable operation of the printing apparatus 1.

5. Action and Effect

As described above, the printing apparatus 1 in the present embodiment includes the determination unit 600 that determines whether the cause of charging abnormality occurring in the transport belt 18c that transports a medium containing calcium carbonate is abnormality of the voltage supply unit 400 or abnormality of the transport belt 18c. The determination condition used when the determination unit 600 determines whether the cause of the charging abnormality occurring in the transport belt 18c is the abnormality of the voltage supply unit 400 or the abnormality of the transport belt 18c is obtained in a manner that machine learning unit 800 performs machine learning based on the learning model in which the rotation amount of the transport belt 18c and the detection result of the detection unit 500 are associated with each other. Thus, even when the abnormality occurring in the transport belt 18c changes by the rotational driving of the transport belt, the determination unit 600 can determine whether the cause of the charging abnormality occurring in the transport belt 18c is the abnormality of the voltage supply unit 400 or the abnormality of the transport belt 18c, with high accuracy. By controlling the printing apparatus 1 in accordance with the determination result of the determination unit 600, it is possible to improve the operational stability of the printing apparatus 1.

Therefore, the printing apparatus 1 in the present embodiment includes a printing apparatus 1 that performs the printing process on stucco paper containing a large amount of calcium carbonate, and a heating heater 48 that fixes the printing material to the medium, so that it is possible to improve the operational stability of the printing apparatus 1 even in a case of the printing apparatus 1 having a concern of accelerating the chemical reaction between calcium carbonate and moisture, the printing apparatus 1 such as an ink jet printer that forms an image on a medium by discharging an ink containing moisture, and the printing apparatus 1 having a high concern that the coagulated calcium carbonate adheres to the transport belt 18c.

6. Modification Example

In the printing apparatus 1 described above, the medium containing calcium carbonate has been described as being stucco paper coated with stucco, but the present disclosure is not limited thereto. Even when the medium on which the printing process is performed in the printing apparatus 1 is high-quality paper, medium-quality paper, coated base paper, and the like containing calcium carbonate, it is possible to exhibit the similar action and effect.

In the present embodiment, the detection unit 500 detects whether or not the abnormality of the charging voltage charged on the transport belt 18c has occurred, by whether the charging detection voltage CD input from the transport unit 300 exceeds or is lower than the correction threshold information HCth in accordance with the threshold information Cth. However, the detection unit 500 may detect whether or not the abnormality of the charging voltage charged on the transport belt 18c has occurred, in accordance with whether or not the charging detection voltage CD input from the transport unit 300 is between the two threshold values.

Although the embodiment and modification examples have been described above, the present disclosure is not limited to the embodiment, and can be carried out in various embodiments without departing from the gist of the present disclosure. For example, the above embodiments can be combined as appropriate.

The present disclosure includes a configuration substantially the same as the configuration described in the embodiment (for example, a configuration having the same function, method and result, or a configuration having the same purpose and effect). The present disclosure also includes a configuration in which a non-essential portion of the configuration described in the embodiment is replaced. Further, the present disclosure includes a configuration having the same action and effect as the configuration described in the embodiment or a configuration capable of achieving the same object. Further, the present disclosure includes a configuration in which a known technique is added to the configuration described in the embodiment.

The following contents are obtained from the above-described embodiment.

According to an aspect, the printing apparatus includes a printing section that performs printing on a medium containing calcium carbonate, a transport section that rotationally drives a transport belt that forms at least a portion of a transport path on which the medium is transported, a voltage supply section that supplies a charging voltage to a charging roller for charging the transport belt, a detection section that detects whether or not charging abnormality has occurred in the transport belt, a determination section that determines whether a cause of the charging abnormality is abnormality of the voltage supply section or abnormality of the transport belt, and a machine learning section that performs machine learning of a determination condition in the determination section based on a learning model in which the rotation amount of the transport belt and a detection result of the detection section are associated with each other.

According to this printing apparatus, the determination section determines whether the cause of charging abnormality occurring in the transport belt that transports a medium containing calcium carbonate is abnormality of the voltage supply section or abnormality of the transport belt, based on the determination condition obtained in a manner that the machine learning section performs machine learning based on the learning model in which the rotation amount of the transport belt and the detection result of the detection section are associated with each other. Thus, the determination section can determine the cause of charging abnormality occurring in the transport belt by the determination conditions in accordance with the status of the transport belt. As a result, it is possible to improve the determination accuracy of the determination section. By controlling the printing apparatus in accordance with the determination result of the determination section, it is possible to improve the operational stability of the printing apparatus.

In the aspect of the printing apparatus, the determination section may determine the cause of the charging abnormality based on the determination condition, the rotation amount of the transport belt, and the detection result of the detection section.

According to this printing apparatus, the determination section determines whether or not the cause of the charging abnormality occurring in the transport belt is the abnormality of the voltage supply section or the abnormality of the transport belt, based on the determination condition obtained by the machine learning section performing machine learning, the rotation amount of the transport belt, and the detection result obtained by the detection section detecting whether or not the charging abnormality has occurred. Thus, it is possible to further improve the determination accuracy of the determination section. Thus, it is possible to further improve the operational stability of the printing apparatus controlled in accordance with the determination result of the determination section.

In the aspect of the printing apparatus, the detection section may include a recording unit in which the threshold information is recorded, a threshold correction unit that corrects the threshold information, and a comparison unit that compares the corrected threshold information with a charging amount by which the transport belt is charged, to detect whether or not the charging abnormality has occurred.

According to this printing apparatus, it is possible to detect whether or not charging abnormality has occurred in the detection section with high accuracy.

In the aspect of the printing apparatus, when the determination section determines that the cause of the charging abnormality is the abnormality of the transport belt, the threshold correction unit may correct the threshold information to alleviate the detection of the charging failure.

According to this printing apparatus, when the determination section determines that the cause of the charging abnormality of the transport belt is the abnormality of the transport belt with a small concern of the abnormality spreading, it is possible to reduce the concern that the charging abnormality of the transport belt has continuously occurred. That is, it is possible to reduce the troublesomeness caused by the continuous charging abnormality of the transport belt and to improve the convenience of the printing apparatus for the user.

In the aspect of the printing apparatus, a voltage value of the charging voltage may be adjusted based on a determination result of the determination section.

According to this printing apparatus, by adjusting the voltage value of the charging voltage in accordance with the determination result by the determination section, it is possible to reduce the concern that the charging abnormality continuously occurs in the transport belt.

The aspect of the printing apparatus may further include a report unit that reports warning information when the determination section determines that the cause of the charging abnormality is the abnormality of the transport belt.

According to this printing apparatus, since, when it is determined that the cause of the charging abnormality is the abnormality of the transport belt, the report unit reports the warning information, it is possible to urge the user to replace the transport belt. This reduces the concern of continuously using the damaged transport belt and, as a result, the concern of deteriorating the operational stability of the printing apparatus decreases.

In the aspect of the printing apparatus, a learning result obtained by the machine learning section performing machine learning may be initialized when the transport belt is replaced.

According to this printing apparatus, it can be supposed that the damage caused to the transport belt is removed by replacing the transport belt. By initializing the learning result corresponding to such removal of the damage, it is possible to improve the detection accuracy of the charging abnormality in the replaced transport belt and the determination accuracy of the above causes.

In the aspect of the printing apparatus, the medium may be stucco paper coated with stucco.

According to this printing apparatus, since the determination section can determine the cause of the charging abnormality occurring in the transport belt with high accuracy, it is possible to reduce a concern of deteriorating the operational stability of the printing apparatus even when stucco paper containing a large amount of calcium carbonate is provided.

The aspect of the printing apparatus may further include a heating section that heats the medium.

According to this printing apparatus, since the determination section can determine the cause of the charging abnormality occurring in the transport belt with high accuracy, it is possible to reduce the concern of deteriorating the operational stability of the printing apparatus even when the printing apparatus includes the heating section that heats the medium.

In the aspect of the printing apparatus, the printing section may perform printing by discharging or applying a water-soluble printing material to the medium.

According to this printing apparatus, since the determination section can determine the cause of the charging abnormality occurring in the transport belt, with high accuracy, it is possible to reduce the concern of deteriorating the operational stability of the printing apparatus even when the printing apparatus performs printing by discharging or applying a water-soluble printing material to the medium.

What is claimed is:

1. A printing apparatus comprising:
    a printing section that performs printing on a medium containing calcium carbonate;
    a transport section including a plurality of transport rollers that rotationally drive a transport belt that forms at least a portion of a transport path in which the medium is transported;
    a voltage supply section including a power supply device that supplies a charging voltage to a charging roller for charging the transport belt;
    a detection section including a detection circuit that detects whether or not charging abnormality occurs in the transport belt;
    a determination section that determines whether a cause of the charging abnormality is abnormality of the voltage supply section or abnormality of the transport belt; and
    a machine learning section that performs machine learning of a determination condition in the determination section, based on a learning model in which a rotation amount of the transport belt and a detection result of the detection section are associated with each other.

2. The printing apparatus according to claim 1, wherein the determination section determines the cause of the charging abnormality based on the determination condition, the rotation amount of the transport belt, and the detection result of the detection section.

3. The printing apparatus according to claim 1, wherein the detection section includes
    a recording unit in which threshold information is recorded,
    a threshold correction unit that corrects the threshold information, and
    a comparison unit that compares the corrected threshold information with a charging amount by which the transport belt is charged, to detect whether or not the charging abnormality occurs.

4. The printing apparatus according to claim 3, wherein when the determination section determines that the cause of the charging abnormality is the abnormality of the transport belt, the threshold correction unit corrects the threshold information to alleviate the detection of the charging abnormality.

5. The printing apparatus according to claim 1, wherein a voltage value of the charging voltage is adjusted based on a determination result of the determination section.

6. The printing apparatus according to claim 1, further comprising:
    a report unit that reports warning information when the determination section determines that the cause of the charging abnormality is the abnormality of the transport belt.

7. The printing apparatus according to claim 1, wherein a learning result obtained by the machine learning section performing machine learning is initialized when the transport belt is replaced.

8. The printing apparatus according to claim 1, wherein the medium is stucco paper coated with stucco.

9. The printing apparatus according to claim 1, further comprising:
    a heating section that heats the medium.

10. The printing apparatus according to claim 1, wherein the printing section performs printing by discharging or applying a water-soluble printing material to the medium.

* * * * *